(12) United States Patent
Jung

(10) Patent No.: US 6,463,999 B1
(45) Date of Patent: Oct. 15, 2002

(54) MULTILOOP TEMPERATURE CONTROL SYSTEM

(75) Inventor: Reinhold Jung, Kierspe (DE)

(73) Assignee: GWK Gesellschaft Warme Kaltetechnik mbH, Kierspe (DE)

( * ) Notice: Subject to any disclaimer, the term of this patent is extended or adjusted under 35 U.S.C. 154(b) by 0 days.

(21) Appl. No.: 09/293,831

(22) Filed: Apr. 16, 1999

(30) Foreign Application Priority Data

Apr. 23, 1998 (DE) .......................................... 198 18 131

(51) Int. Cl.[7] .............................................. F25B 29/00
(52) U.S. Cl. .................... 165/206; 165/64; 165/263; 165/264; 165/137; 392/471; 392/490; 219/476; 219/477; 219/478; 219/480; 237/59; 237/63; 425/143; 425/144
(58) Field of Search ........................... 165/206, 63, 64, 165/101, 11.1, 263, 264, 137; 392/477, 490; 219/478, 477, 476, 480; 237/59, 63; 425/143, 144

(56) References Cited

U.S. PATENT DOCUMENTS

| | | | | |
|---|---|---|---|---|
| 1,880,794 A | * | 10/1932 | Carter ......................... | 219/480 |
| 2,762,652 A | * | 9/1956 | Carter ......................... | 392/471 |
| 3,360,032 A | * | 12/1967 | Sherwood ..................... | 165/264 |
| 4,261,415 A | * | 4/1981 | Smith, Jr. .................... | 165/11.1 |
| 5,562,935 A | * | 10/1996 | Martin ......................... | 425/144 |
| 5,577,552 A | * | 11/1996 | Ebinvma et al. ............. | 165/101 |
| 5,601,141 A | * | 2/1997 | Gordon et al. ................ | 165/64 |
| 5,620,646 A | * | 4/1997 | Sparer et al. ................. | 425/143 |
| 5,984,716 A | * | 11/1999 | Starkey ........................ | 425/144 |
| 6,000,458 A | * | 12/1999 | Watanabe et al. ............ | 165/263 |

FOREIGN PATENT DOCUMENTS

| | | | | |
|---|---|---|---|---|
| DE | 2916748 | * | 10/1980 | ................ 165/11.1 |
| DE | 3416574 | * | 4/1984 | |

OTHER PUBLICATIONS

GWK Kompakte Mehrkreis—Temperiergerate Mit drucküberlagertem Kreislauf der Baureihe integrat (brochure), Feb. 1997.*

* cited by examiner

Primary Examiner—John K. Ford
(74) Attorney, Agent, or Firm—Herbert Dubno

(57) ABSTRACT

A multiloop temperature-control system has a hydraulic bus connected to a plurality of loops for the temperature-control medium and respective hydraulic modules connected to the hydraulic bus, and through the hydraulic bus, to these loops. Plug connectors join each hydraulic module with an electrical supply and control module and the supply and control modules in turn are connected by plug and jack connectors to an electrical bus.

15 Claims, 6 Drawing Sheets

MULTILOOP TEMPERATURE CONTROL SYSTEM

FIELD OF THE INVENTION

My present invention relates to a multiloop temperature-control system for the temperature control, usually heating and/or cooling of a plurality of loads, especially injection molding, die casting and like apparatus having passages which can be connected to a source of a heating and/or cooling media. More particularly, the invention relates to a system of lot the type described in which one or more temperature-control units with a coolant connection, electrical connection, recirculating pump arrangement, heater, cooler and control means can be provided for each circulation path at which temperature control must be applied.

BACKGROUND OF THE INVENTION

Multiloop temperature-control systems are required for temperature control in such industrial systems as injection molding units for synthetic resins. The injection molding of large area and complex plastic bodies requires accurate and careful control of the die temperature. Since the dies can be very large and heavy, the temperature-control unit must have high capacity to allow the die to be brought to the requisite production temperature in a sufficiently short time. A single die may have a number of loops at which different temperatures must be controlled or maintained with accuracy and high sensitivity.

To fulfill these divergent requirements of high capacity and control sensitivity and speed of response, the die is usually equipped with a number of passages forming respective loops in which separate circulations of the temperature-controlled medium are maintained, the loops being usually independently and individually controlled via corresponding temperature-control units. For a rapid change of the temperature level of the entire die, for example during the heating up, the sum of the heating and cooling capacities of all of the temperature-control units plays a role.

In the art, multiloop temperature-control systems are known in which a number of control units are mounted in a common housing to provide a single functional apparatus. The drawback of this system is that the failure of one of the components requiring a replacement or repair thereof brings the entire multicomponent temperature-control system to standstill since the entire apparatus must be disassembled to permit repair.

It is also a drawback of earlier systems that the number of loops which can have their temperatures regulated by a system is set at the factory or upon fabrication so that generally, the system cannot be expanded for additional loops or altered to provide greater capacity for one loop than for another.

OBJECTS OF THE INVENTION

It is, therefore, the principal object of the present invention to provide an improved multiloop temperature-control system whereby the aforedescribed drawbacks are avoided.

It is another object of this invention to provide a multiloop temperature-control system in which individual components can be easily replaced or additional units supplied, thereby enabling the apparatus to be utilized for different loop arrangements and requirements and for different types of installations.

SUMMARY OF THE INVENTION

These objects and others which will become apparent hereinafter are attained, in accordance with the invention in which the temperature-control system is of modular construction and is comprised of the following components:

temperature-controlling hydraulic modules, electrical modules assigned to the hydraulic modules, a hydraulic bus for supplying and discharging the temperature-control medium, usually a liquid, and an electrical bus with electrical supply lines.

According to the invention a plurality of electrical modules can be releasably connected readily to the electrical bus and these device-controlling electrical units are easily connectable to the hydraulic module directly or via connecting cables and the hydraulic modules in turn are easily connectable to and disconnectable from the hydraulic bus which connects the hydraulic modules, in turn, to the intake and discharge lines and to the lines or passages of a load, i.e. to the loops.

More particularly the multiloop temperature-control system comprises:

a hydraulic bus having inlet and discharge lines for a temperature-regulating medium and respective supplies and returns connectable selectively to respective medium-circulation loops of respective loads;

a plurality of spaced apart temperature-controlling hydraulic modules, variable in number, and readily connectable to the hydraulic bus at ports communicating a respective supply and a respective return and ports communicating with the lines, each of the temperature-controlling hydraulic modules including a circulating pump for the medium, thermal means for changing a temperature of the medium, and piping connecting the ports, the pump and the thermal means;

a respective electric module readily connectable to and disconnectable from each of the hydraulic modules for electrically supplying same; and an electrical bus having conductors connected to an electric power source and readily connectable to and disconnectable from each of the electric modules, the electrical bus serving all of the electrical modules, the electrical modules being variable in number along the electrical bus.

Each of the temperature-controlling hydraulic modules can include at least one such pump, at least one heater and a cool or cold water controlling valve, a heat exchanger can also be included in each temperature-controlling hydraulic module. Each of the electric modules can comprise plug connectors for connecting the respective electric module to the electrical bus and the respective hydraulic module, and electronic circuitry for controlling the respective hydraulic module.

The hydraulic bus can comprise:

a bypass passage between the inlet and discharge lines;

circulation-controlling valves between respective ports connected to the hydraulic modules and the respective loop; and a cool-water valve between the intake and an outlet side of the respective hydraulic module.

Furthermore, the hydraulic bus can include valve systems for hydraulically combining a plurality of the hydraulic modules to supply one of the loops or valve systems for hydraulically combining at least one reserve hydraulic module (a module not connected with its own loop) with at least one hydraulic module servicing one of the loops.

The hydraulic bus can be provided at a side thereof at which the bypass is provided with an additional inlet and outlet for the intake and discharge line to increase the number of hydraulic modules connectable to the hydraulic bus.

The system can also comprise a holder connected to the loads, i.e. the loops and to which the hydraulic bus is affixed, the hydraulic bus being connected to the loops by closable valves.

The multiloop temperature-control system of the invention thus is constructed from a number of individual modules which can be connected between the electrical bus and the hydraulic bus and the hydraulic bus can be installed proximal to the load, namely, a die or group of dies having the passages through which the temperature-control medium flows. The hydraulic bus can be affixed to a bracket ahead of the injection-molding die or mounted on this die itself. To this hydraulic bus the temperature-control hydraulic module can be connected in a simple manner, for example by plug couplings with locking elements. The electric bus and the electric modules which can be equipped with the power supplies and control circuitry for the hydraulic modules can then be attached to the hydraulic module.

The electrical bus and the electrical modules which are affixed thereto, usually by plug and jack connectors, can be assembled at a central control station so that only an electrical connection between each electrical module and the respective hydraulic module must be created. This electrical connection can also be a plug and jack connection.

The multiloop system of the invention enables the rapid and easy removal of a defective component for shutdown only of the temperature-control channel associated therewith without requiring that the other elements of the multiloop system be turned off. Since all of the modules are connected to the busses and to each other by simple plug connections, the coupling and decoupling is simplified as well. If it is necessary to configure the system for a different power or capacity at one or the other of the several loops is wound need only replace the temperature hydraulic module and that loop with another of the greater or lesser capacity. capacity adjustment by simple module replacement can thus be ensured.

The multiloop temperature-control system of the invention also has the advantage that it is compact and easy to install. Because of the ability to rapidly replace the individual components, there is no need for disassembly or shutdown of components which are still effective and it is even possible to repair components in place in an economical and rapid manner. Above all, rapid replacement of a module with lower capacity by a module with higher capacity represents a significant advantage over earlier systems. With the invention it is also possible to connect two or more temperature-control hydraulic modules to a single loop or load, for example in the case where that load has a significantly higher requirement for circulating medium than another loop.

Because there are separate bus systems for the hydraulic and electrical components of the system, they can be installed at different locations. For example the hydraulic modules and the hydraulic bus can be located proximal to the load and the electrical modules and the electrical bus can be located remote from the load and proximal to a control station. The number of loops which are associated with one another on a given bus is theoretically unlimited and where necessary it may be advantageous to feed the cooling water and hence provide an inlet and an outlet to the bus pipes at each end of the hydraulic bus so that an additional inlet and outlet is provided, for example, proximal to the bypass. Preferably the hydraulic bus is a linearly-extending horizontal element as is the electrical bus.

The quick coupling connectors between the electrical modules and the electrical bus, the electrical modules and the hydraulic modules and between the hydraulic modules and the hydraulic bus can be so configured that they include conical guide pins that precenter the connectors and ensure centering of them as they are shoved one into another until they reach their end positions in which they are locked. The locking can be effected by means of a clamping screw or a clamping lever. The electrical part of the system may have plug and jack connectors for data lines as well.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
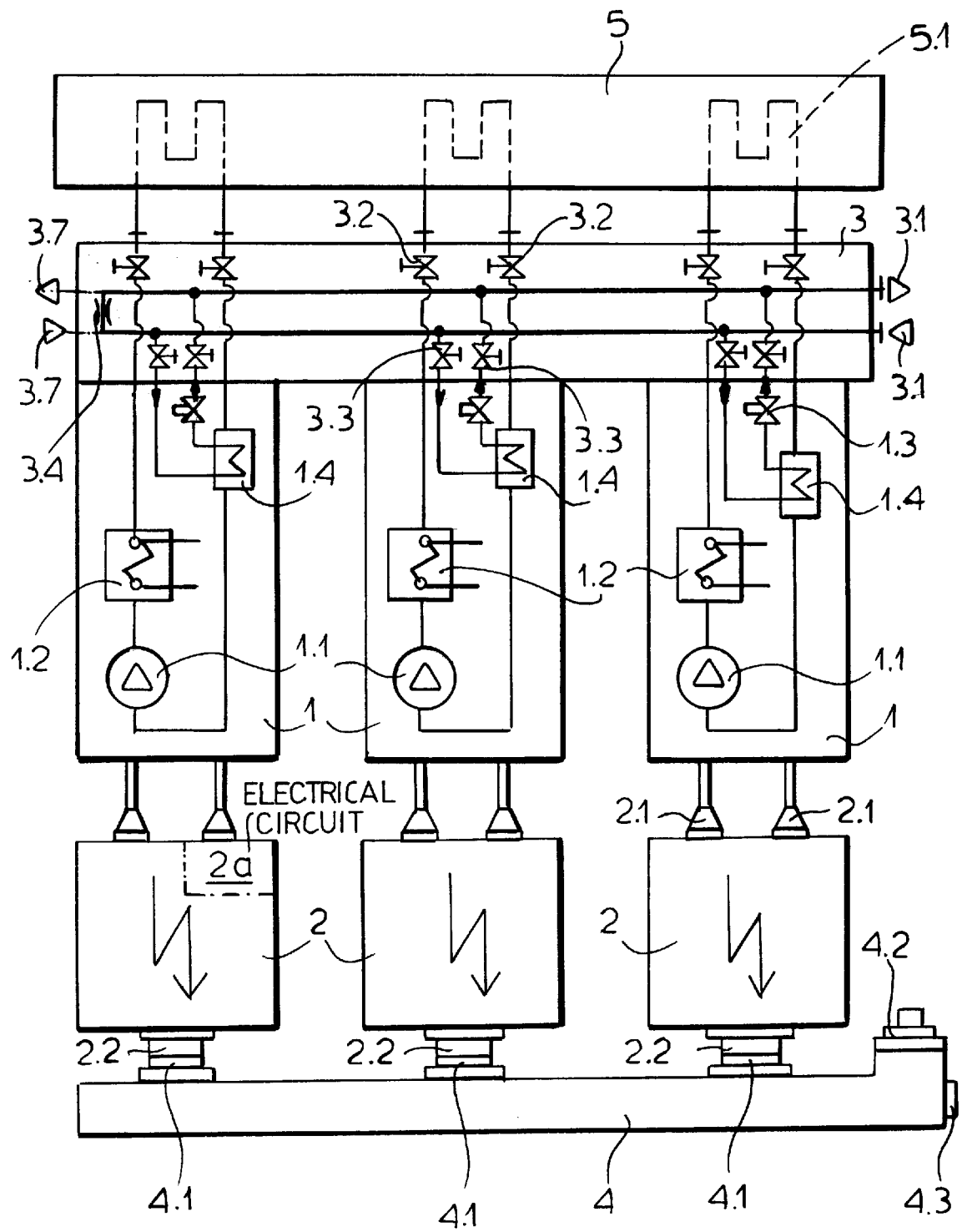
FIG. 1 is a plan view of a multiloop temperature-control system schematically illustrating the invention and provided with three loops.

The drawing shows a multiloop system for controlling the temperature of injection-molding dies or the like. For this purpose, the load or die 5 can be provided with passages 5.1 forming a plurality of loops and through which a flow of a temperature-control liquid is conducted.

The temperature-control system is of modular construction and comprises temperature regulating hydraulic units or modules 1, temperature-control electrical modules 2 with a hydraulic bus 3 for supplying and carrying away the circulating liquid, and an electric bus 4 containing electrical supply lines and, if desired, communications and data lines. The electrical modules 2 can have control circuitry 2a for the respective hydraulic units 1.

The electrical modules 2 are connected by plug and jack connectors 2.2 to the electric bus 4 which have mating electrical plug connectors 4.1. The electrical bus 4 additionally has a main switch 4.2 for all circuits and a current supply 4.3 connected to a line current source.

The electrical modules 2 are connected, in turn, by cable connectors 2.1 of the plug and jack type to the hydraulic modules 1. These hydraulic modules, in turn, are easily disconnectable from or connectable to the hydraulic bus 3. Each temperature-control hydraulic module 1 has, for example, a pump 1.1 for circulating the temperature-control liquid (for example cooling water) in addition, each control hydraulic module 1 has a heater 1.2, a cold water control valve 1.3 and a heat exchanger 1.4. The heater 1.2 may be heated from the electrical module 2 connected to the respective hydraulic module.

The hydraulic bus 3 also has a shut-off valve 3.2 for the circulating water in each loop so that the load or molding die 5 can be disconnected by closure of the shut off 3.2 from the loops 5.1. Valve 3.3 can be shut off to permit separation of the hydraulic bus 3 from the hydraulic modules 1. The hydraulic bus also has a bypass passage 3.4 by which the cold water intake passage is connected to the cold water discharge passage.

Figure 6:
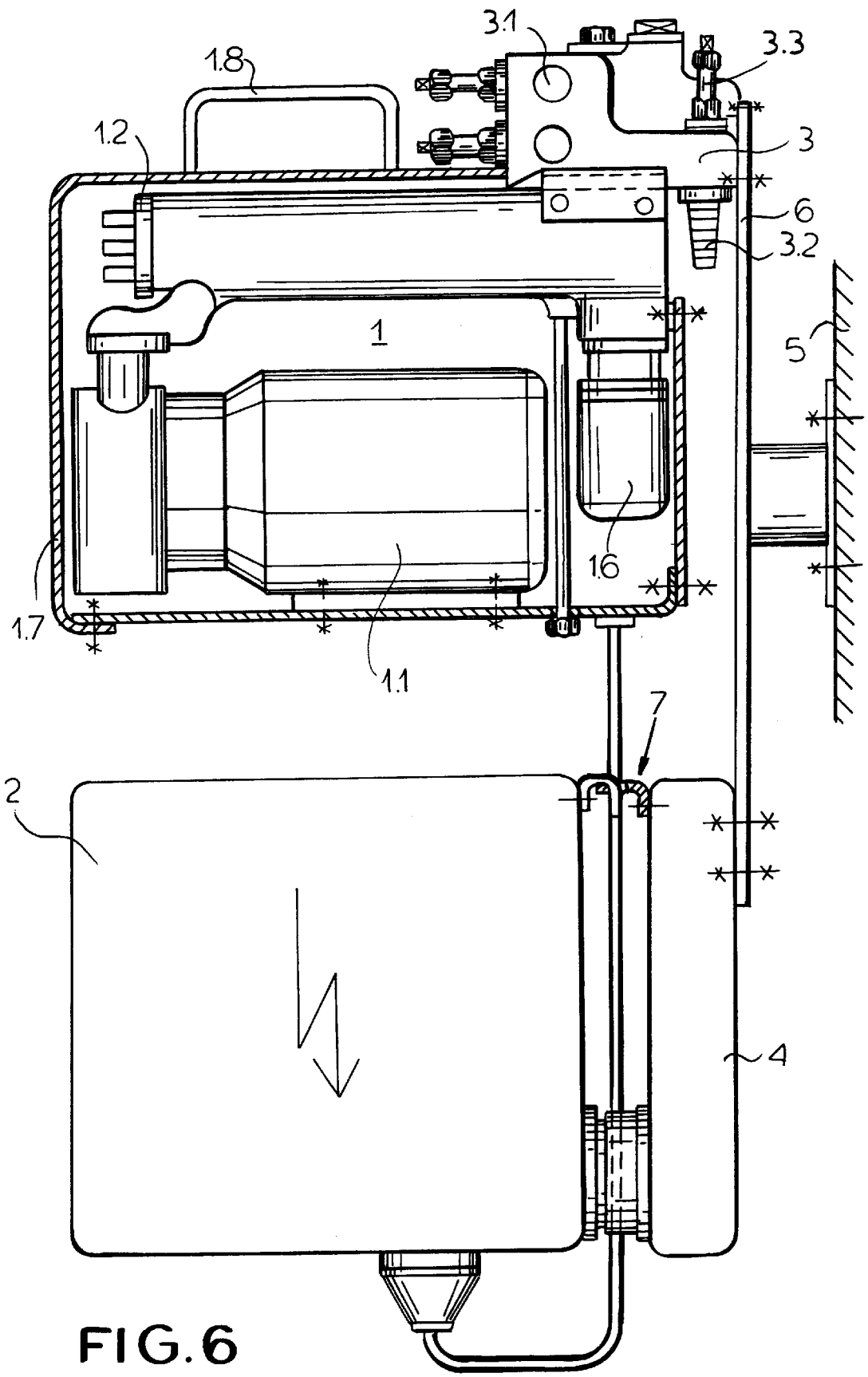
FIG. 6 is a sectional view showing the two modules mounted on a common support and partly broken away.

As will be especially clear from FIG. 6, the hydraulic bus 3 is fastened by a mounting plate or bracket 6 on the thermal load 5. The electrical bus 4 can also be mounted on this support or on another support. As will be apparent from FIG. 6 the two bus elements 3 and 4 can be secured to the support 6 and the electrical units 2 can be suspended from the electrical bus at 7 thereon and their plug connectors joined to those of the electrical bus. The hydraulic modules 1 are directly connected to the hydraulic bus 3 and are fastened thereon via plug connectors so as to be easily releasable therefrom.

Figure 2:
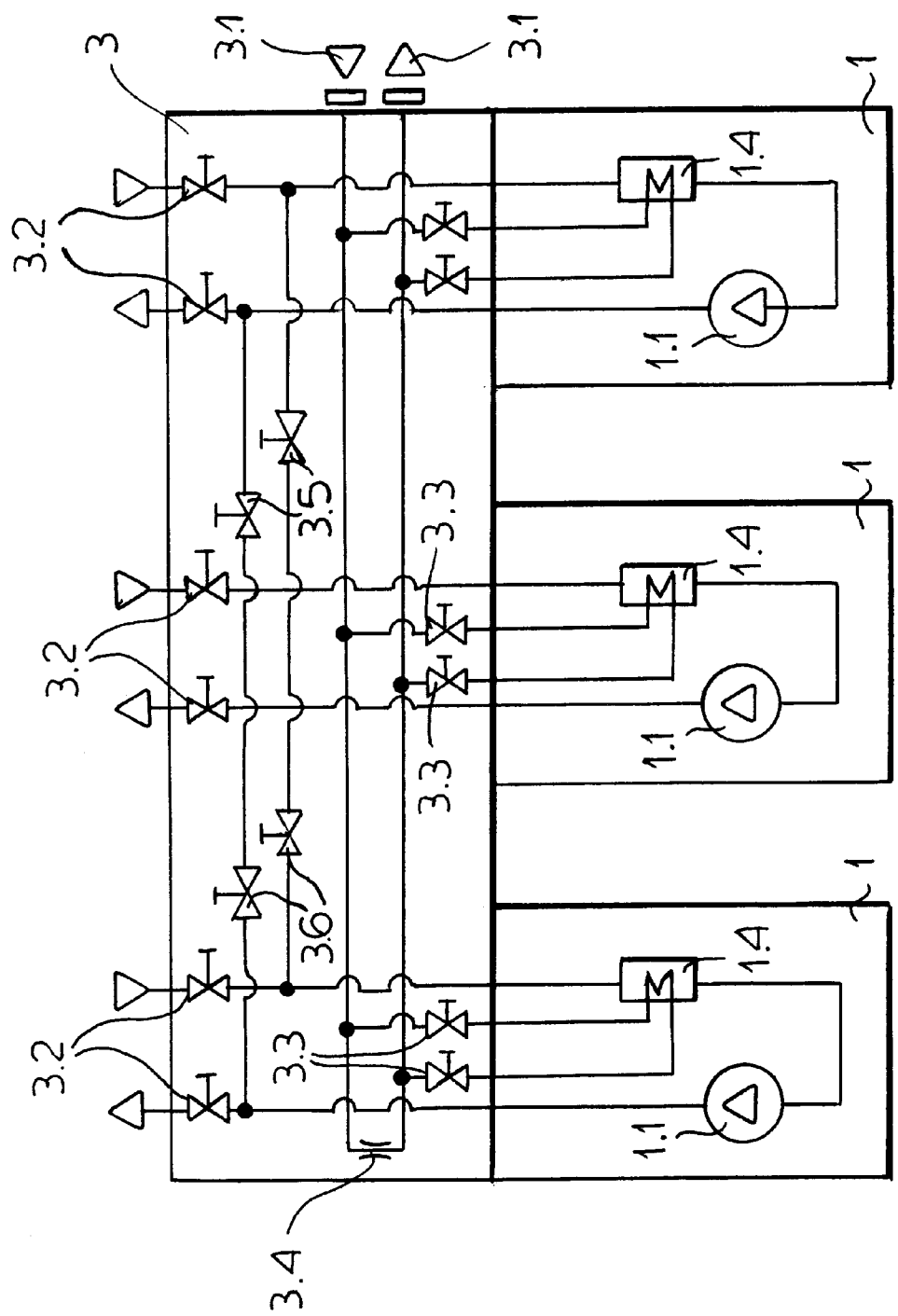
FIG. 2 is a detail of the hydraulic bus in a modification of the configuration shown in FIG. 1.

In the configuration of FIG. 2, the hydraulic bus has additional valve systems which permit two or more of the temperature-control units to be coupled to two or more loops for the purpose of capacity multiplication. For example, in this embodiment, in addition to the valves 3.2 and 3.3 previously described, each loop can be connected to other loops by valves 3.5 and 3.6 so that two or more temperature-control modules 1 can feed each of the loops.

If additional or higher capacity units are provided as the hydraulic modules 1, an additional inlet and outlet can be provided at 3.7 (FIG. 1) at the same end of the hydraulic bus 3 as the bypass 3.4 to supply and remove the added quantities of the cooling liquid.

Figure 3:
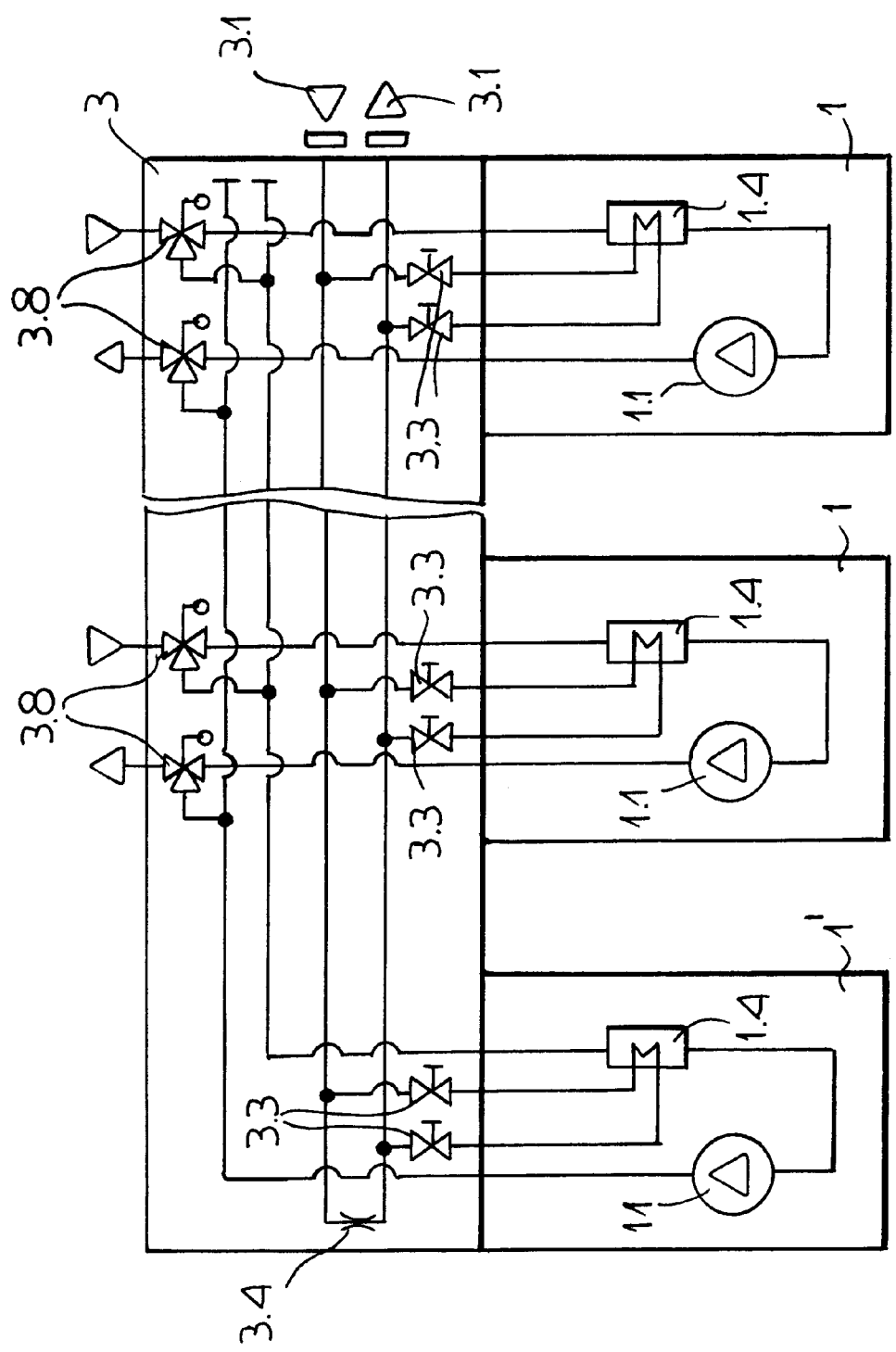
FIG. 3 is a view similar to FIG. 2 of another modification.

In the embodiment of FIG. 3, three-way valves can be provided at 3.8 to control the supply and return from each loop and a reserve temperature-control unit 1' can be provided in addition to those which normally service the loops so that the reserve unit can be additionally connected to either of the loops.

Figure 4:
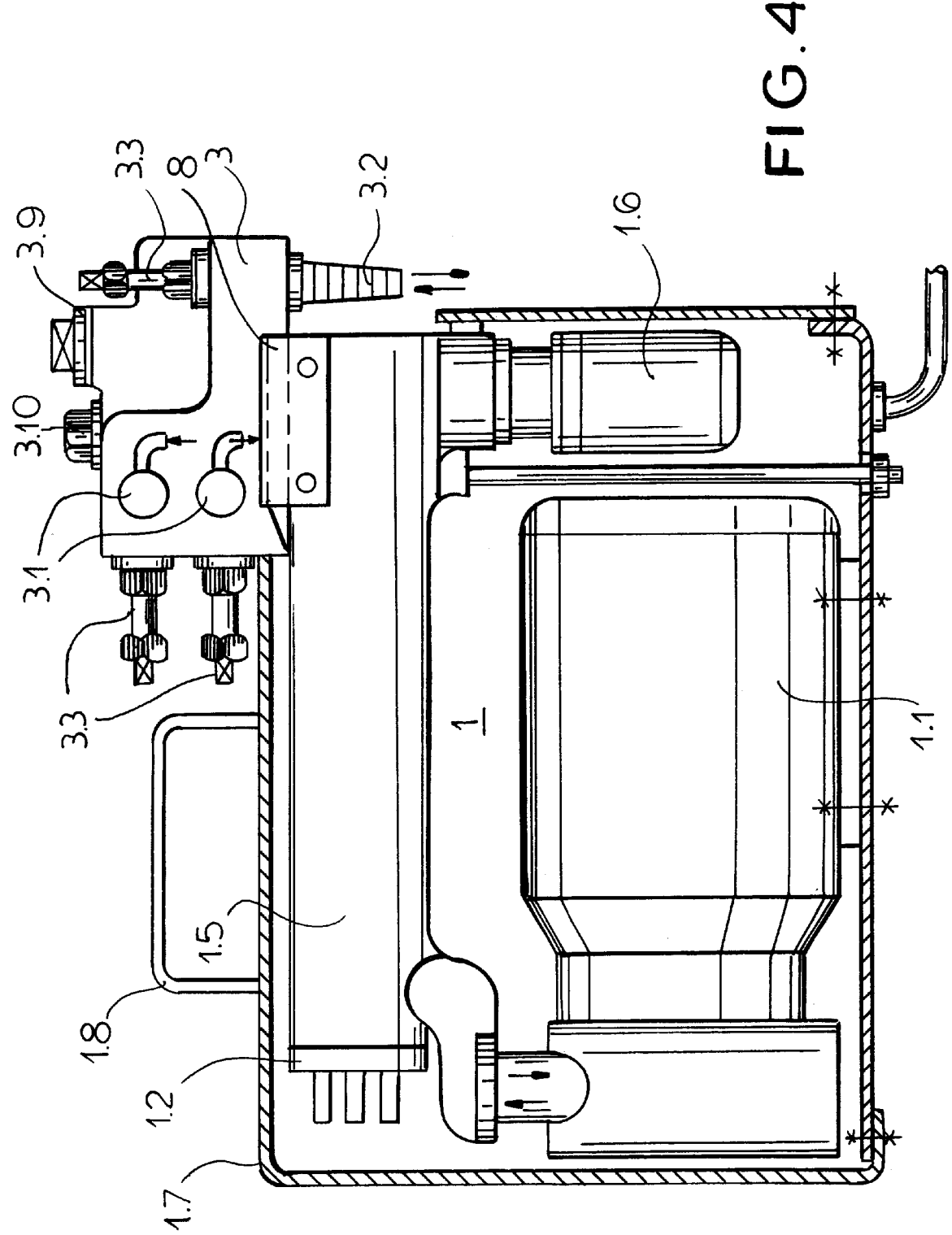
FIG. 4 is a section through a hydraulic module according to the invention.

In FIG. 4, I have shown the hydraulic bus 3 with its cold water and return passages 3.1, the supply and return passages 3.2 for the respective loops and actuators for the valves 3.3. In addition, the recirculation path through each module 1 can include a filter 3.9. A clamping element such as a bolt 3.10 can serve to secure the hydraulic bus 3.3 on the modules 1 and vice versa.

Each module 1 can include the pump 1.1 mentioned earlier and a plug 1.5 to which a control valve 1.6 can be affixed and which includes a heating unit 1.2 within the housing or jacket 1.7. A grip 1.8 may be provided on each hydraulic module to enable it to be mounted in place or moved with ease. At 8 (FIG. 4) I have also shown a guide system which ensures alignment of the temperature-control module 1 on the hydraulic bus.

Figure 5:
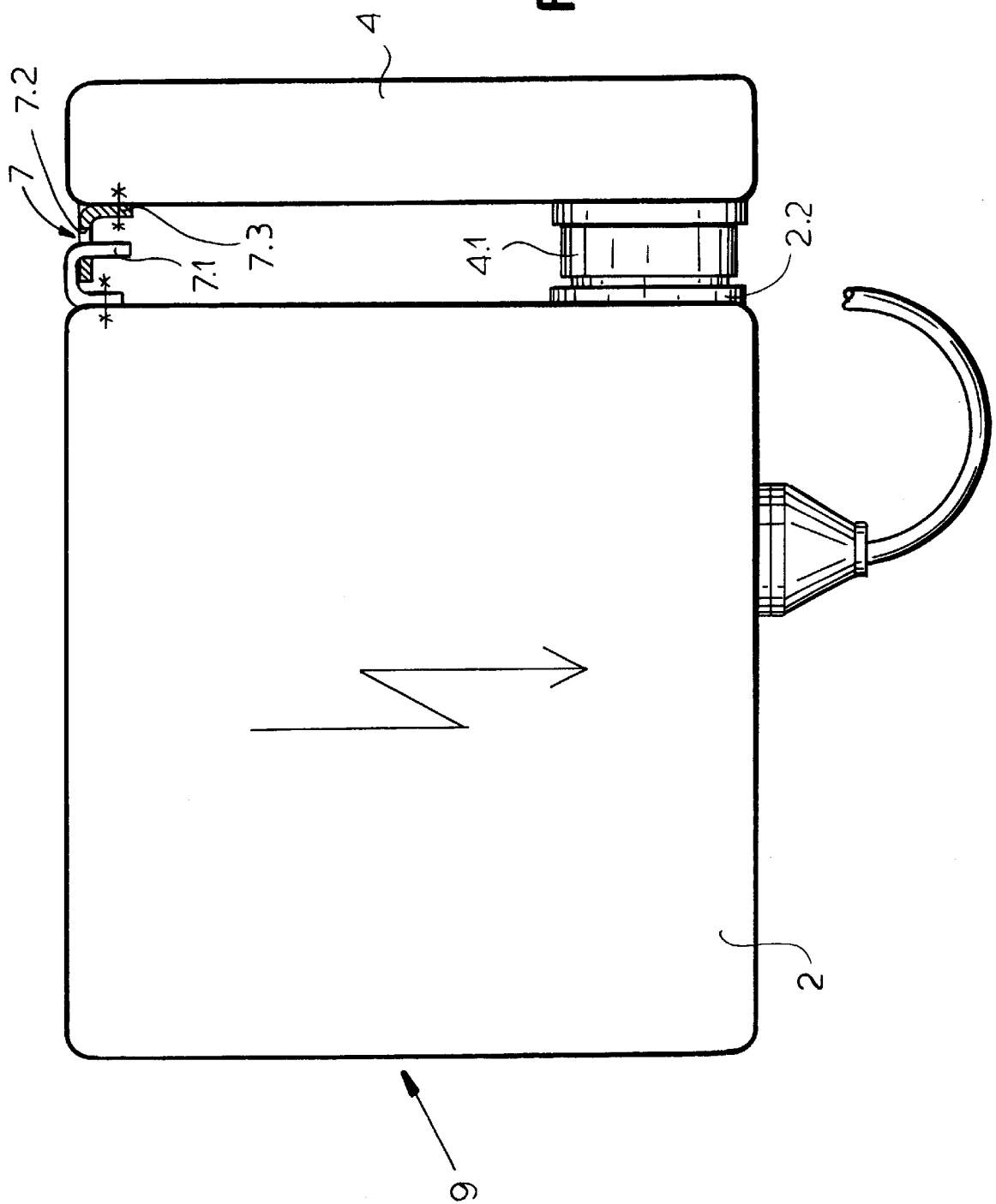
FIG. 5 is an elevational view of an electrical module.

FIG. 5 shows in an enlarged form the electric bus 4 and the electrical module 2. A holder or bracket 7 enables the module 2 to be suspended from the module 4 by the insertion of the leg 7.1 in an opening 7.2 of the bracket 7.3 shown in section in FIG. 5. Because the parts 7.1 and 7.3 can pivot, the two connector parts 2.2 and 4.1 of the plug and jack connection between the bus and the module 2 can be inserted into and separated from one another. The service side of the module 2 is represented at 9 and can be provided with control buttons and indicator gauges or the like for the respective circulations.

The invention, of course, is not limited to the embodiments illustrated but can encompass combinations of the illustrated and described device as well as modifications thereof within the spirit and scope of the appended claims.

I claim:

1. A multiloop temperature-control system, comprising:
   a hydraulic bus having inlet and discharge lines for a temperature-regulating medium and respective supplies and returns connectable selectively to respective medium-circulation loops of respective loads;
   a plurality of spaced apart temperature-controlling hydraulic modules, variable in number, and readily connectable to said hydraulic bus at ports communicating a respective supply and a respective return and ports communicating with said lines, each of said temperature-controlling hydraulic modules including a circulating pump for said medium, thermal means for changing a temperature of the medium, and piping connecting said ports said pump and said thermal means;
   a respective electric module readily connectable to and disconnectable from each of said hydraulic modules for electrically supplying same; and
   an electrical bus having conductors connected to an electric power source and readily connectable to and disconnectable from each of said electric modules, said electrical bus serving all of said electrical modules, said electrical modules being variable in number along said electrical bus, each of said temperature-controlling hydraulic modules comprises at least one pump, at least one heater, and a cool water control valve, and at least one heat exchanger.

2. The multiloop temperature-control system defined in claim 1 wherein said electric modules each comprise plug connectors for connecting the respective electric module to said electrical bus and the respective hydraulic module, and electronic circuitry for controlling the respective hydraulic module.

3. The multiloop temperature-control system defined in claim 2 wherein said hydraulic bus comprises:
   a bypass passage between said inlet and discharge lines;
   circulation-controlling valves between respective ports connected to said hydraulic modules and the respective loop; and
   a cool-water valve between said intake and an outlet side of the respective hydraulic module.

4. The multiloop temperature-control system defined in claim 3 wherein said hydraulic bus further comprises valve systems for hydraulically combining a plurality of said hydraulic modules for servicing a common one of said loops.

5. The multiloop temperature-control system defined in claim 4 wherein said hydraulic bus further comprises valve systems for hydraulically combining at least one reserve hydraulic module with at least one hydraulic module servicing one of said loops.

6. The multiloop temperature-control system defined in claim 5 wherein said hydraulic bus is provided at a side thereof at which said bypass passage is provided with an additional inlet and outlet for said intake and discharge lines to increase the number of hydraulic modules connectable to said hydraulic bus.

7. The multiloop temperature-control system defined in claim 6, further comprising a holder connected to said loops and to which said hydraulic bus is affixed, said hydraulic bus being connected to said loops by closable valves.

8. The multiloop temperature-control system defined in claim 7 wherein said hydraulic bus has ports communicating with ports of said hydraulic modules at respective connections with said hydraulic modules.

9. The multiloop temperature-control system defined in claim 1 wherein said electric modules each comprise plug connectors for connecting the respective electric module to said electrical bus and the respective hydraulic module, and electronic circuitry for controlling the respective hydraulic module.

10. The multiloop temperature-control system defined in claim 1 wherein said hydraulic bus comprises:
- a bypass passage between said inlet and discharge lines;
- circulation-controlling valves between respective ports connected to said hydraulic modules and the respective loop; and
- a cool-water valve between said intake and an outlet side of the respective hydraulic module.

11. The multiloop temperature-control system defined in claim 1 wherein said hydraulic bus further comprises valve systems for hydraulically combining a plurality of said hydraulic modules for servicing a common one of said loops.

12. The multiloop temperature-control system defined in claim 1 wherein said hydraulic bus further comprises valve systems for hydraulically combining at least one reserve hydraulic module with at least one hydraulic module servicing one of said loops.

13. The multiloop temperature-control system defined in claim 10 wherein said hydraulic bus is provided at a side thereof at which said bypass passage is provided with an additional inlet and outlet for said intake and discharge lines to increase the number of hydraulic modules connectable to said hydraulic bus.

14. The multiloop temperature-control system defined in claim 1, further comprising a holder connected to said loads and to which said hydraulic bus is affixed, said hydraulic bus being connected to said loops by closable valves.

15. The multiloop temperature-control system defined in claim 1 wherein said hydraulic bus has ports communicating with ports of said hydraulic modules at respective connections with said hydraulic modules.

* * * * *